United States Patent [19]
Hankes et al.

[11] 3,885,745
[45] May 27, 1975

[54] WASTE PULPING MACHINE WITH REPLACEABLE SHEAR MEMBERS

[75] Inventors: Robert W. Hankes, Downingtown; Eugene J. Schramm, Norristown; James C. Spiker, Honey Brook; Frank T. Tober, Coatesville, all of Pa.

[73] Assignee: Somat Corporation, Pomeroy, Pa.

[22] Filed: Nov. 19, 1973

[21] Appl. No.: 417,079

[52] U.S. Cl. ............. 241/46.11; 241/240; 241/287
[51] Int. Cl. ........................................... B02c 13/14
[58] Field of Search ....... 241/46.11, 46.17, 73, 239, 241/240, 286, 287

[56] References Cited
UNITED STATES PATENTS

| | | | |
|---|---|---|---|
| 96,177 | 10/1869 | Wells | 241/240 |
| 2,216,612 | 10/1940 | Dimm et al. | 241/73 X |
| 2,706,621 | 4/1955 | Laird | 241/46.17 X |
| 2,867,386 | 1/1959 | Edwards et al. | 241/46.11 |
| 2,902,225 | 9/1959 | Hoaglund | 241/46.11 X |
| 3,085,756 | 4/1963 | Danforth et al. | 241/46.17 X |
| 3,620,460 | 11/1971 | Hankes | 241/46.11 |

FOREIGN PATENTS OR APPLICATIONS 1,074,952  2/1960  Germany .............................. 241/73

*Primary Examiner*—Roy Lake
*Assistant Examiner*—Craig R. Feinberg

[57] ABSTRACT

A waste pulping machine of the type utilizing a rotating impeller in which the impeller is provided with one or more shear members which can cooperate with one or more stationary shear members. The shear members comprise replaceable blades mounted to appropriate supports to obtain the desired shearing action. The machine further includes a sieve formed of a plurality of identical replaceable perforated arcuate members together defining a ring closely surrounding the impeller.

3 Claims, 6 Drawing Figures

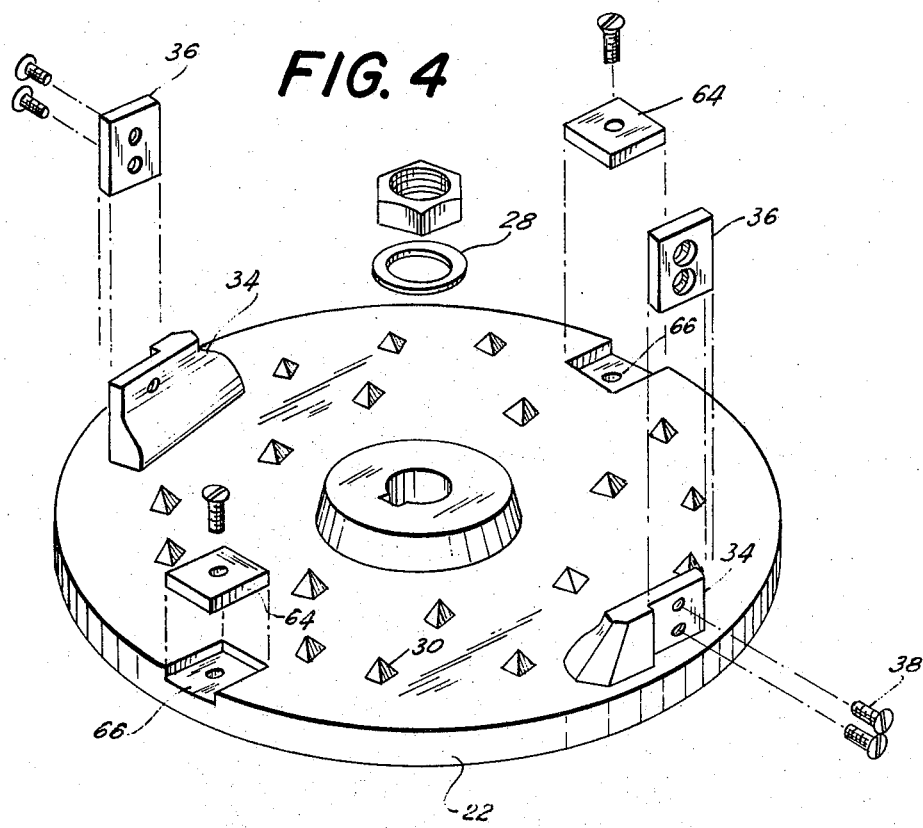
FIG. 4
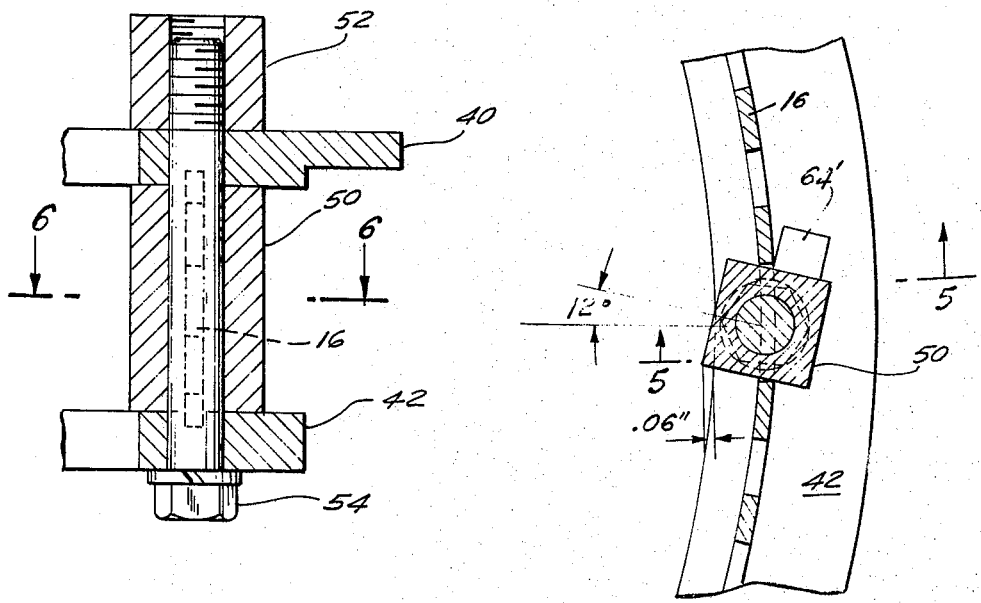
FIG. 5
FIG. 6

3,885,745

WASTE PULPING MACHINE WITH REPLACEABLE SHEAR MEMBERS

BACKGROUND OF THE INVENTION

The present invention relates to the art of waste disposal and more particularly to the field of wet pulping equipment for use in waste disposal.

The application of wet pulping equipment for waste disposal is finding increasing acceptance. In equipment of this type, waste materials are introduced into an impeller-created vortex of water, reduced to a pulp, passed on to a water extraction device where the excessive water is separated and returned to the pulper for reuse. Such waste pulping machines are often provided with one or more blades mounted to the impeller to provide a shearing action as the impeller is rotated. The blades serve to enable the pulping equipment to handle a quantity of non-pulpable material, such as plastic, which generally constitutes a minor portion of the waste to be disposed.

One problem encountered with such equipment is that the shearing blades become dull or damaged through normal use. Heretofore replacement of the blades required considerable effort since the blades were permanently bonded in position.

It is therefore a principal object of the present invention to provide an improved waste pulping machine provided with shearing blades which may readily be replaced in time as the blades become worn or damaged.

SUMMARY OF THE INVENTION

The above and other beneficial advantages are attained by providing a waste pulping machine of the type in which waste materials are introduced into an impeller-created vortex of water and reduced to a pulp wherein the impeller is provided with one or more blades constructed and arranged to cooperate with one or more stationary blades on a sieve surrounding the impeller. The impeller blades, stationary blades, and components of the sieve comprise readily removable and changeable components. The shear blades provide first and second edges which periodically mate upon rotation of the impeller to provide a desired shearing action for the waste pulping machine. The shear members may readily and easily be removed when they become worn or damaged.

DESCRIPTION OF THE DRAWINGS

In the accompanying drawings:

FIG. 4 is a perspective exploded view of the pulping machine impeller;

FIG. 5 is a fragmentary elevational sectional view taken along reference lines 5—5 of FIG. 6 in the direction indicated by the arrows; and FIG. 6 is a sectional view taken along reference lines 6—6 of FIG. 5 in the direction indicated by the arrows.

DETAILED DESCRIPTION OF THE PREFERRED EMBODIMENT

Figure 1:
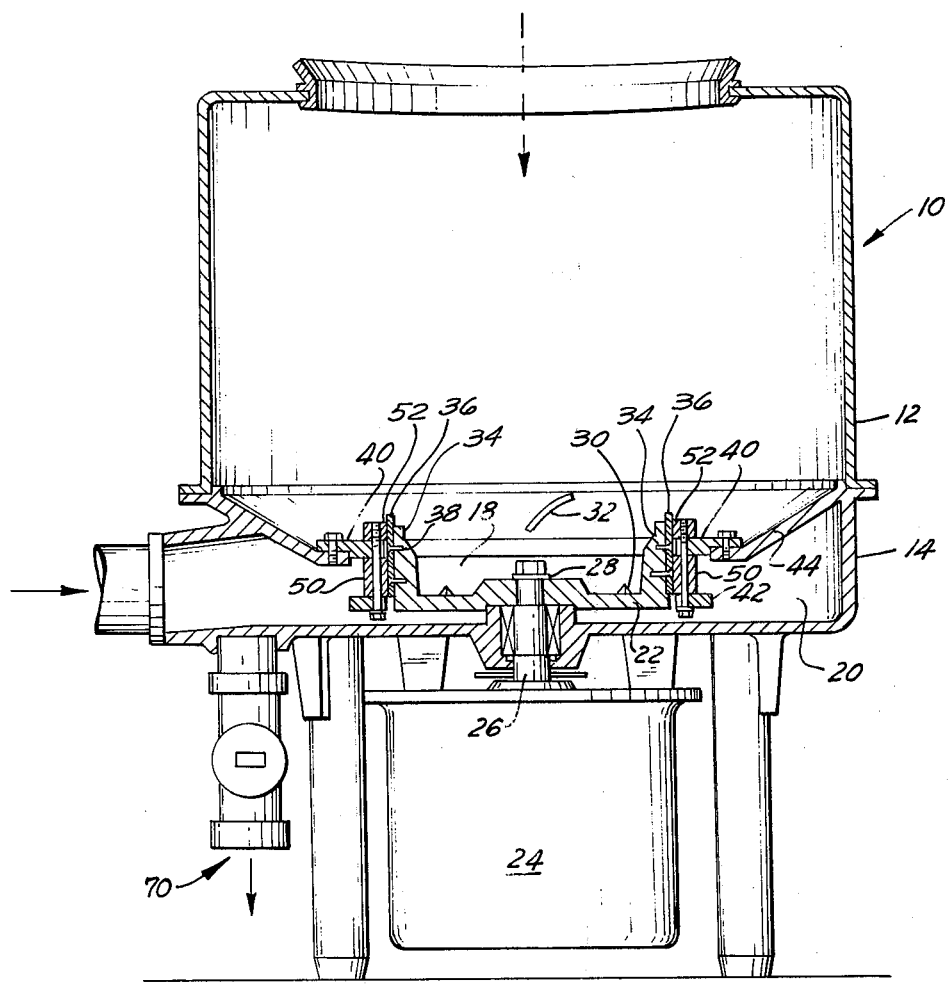
FIG. 1 is a partial sectional elevational view of a waste pulping machine in accordance with the present invention.

Reference is now made to the drawings wherein similar components bear the same reference numerals throughout the several views. In FIG. 1, a waste pulping machine 10 is depicted comprising a cylindrical shell 12 beneath which is a circular base 14. A sieve 16 comprising essentially a perforated ring is mounted within the base separating the base into a pulping chamber 18 and slurry chamber 20. The sieve closely surrounds an impeller 22 which is rotated by motor 24 through a shaft 26 keyed to the impeller and protected from leakage by a mechanical flange 28.

Impeller 22 is provided with a plurality of cutting teeth 30 on its upper surfaces. Baffles 32 direct waste material within the cylindrical shell over the impeller area where the pulping takes place. The impeller upper surface further includes shear member supports 34 extending upwardly. A shear member or blade 36 is removably mounted to each of the supports with screws 38 that pass through openings in the blades to engage threaded holes in the supports 34. Although two shear blades are shown mounted on the impeller of this embodiment, the actual number employed is a matter of choice. As shown, the blades extend above the top of the sieve.

Figure 2:
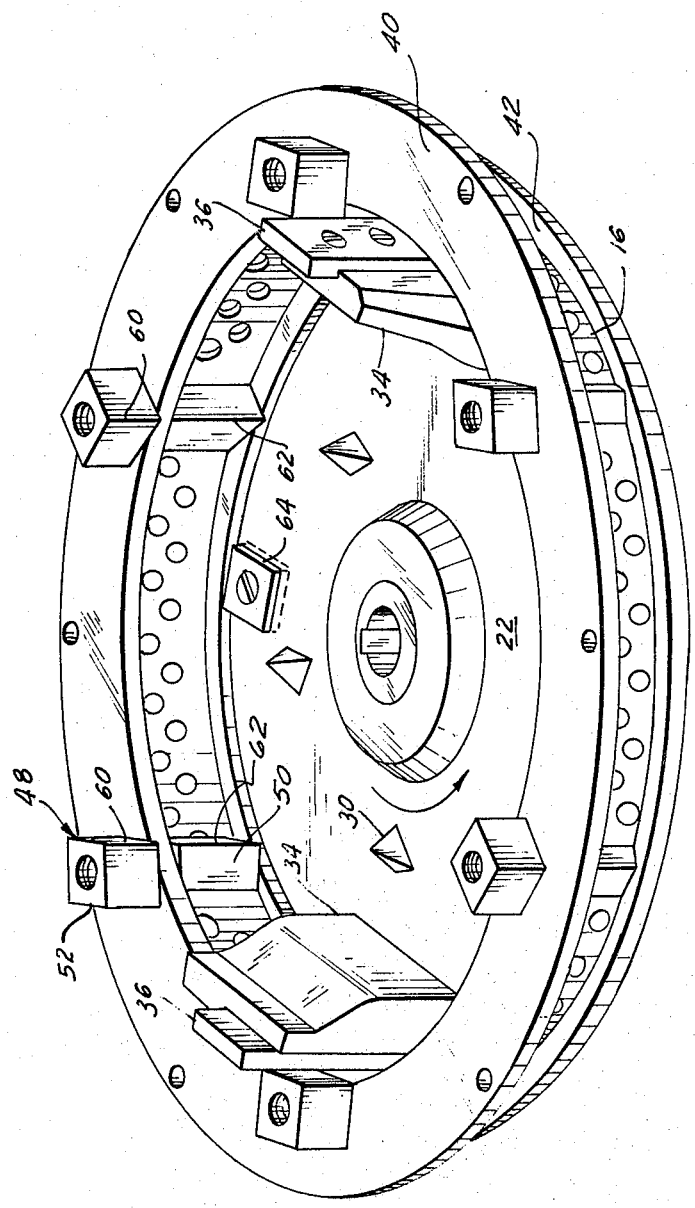
FIG. 2 is an enlarged perspective view depicting the rotating shear members secured to the pulping machine impeller and associated fixed shear members.

As shown in FIG. 2, the sieve 16 closely surrounds impeller 22. Sieve 16 is positioned between an upper ring 40 and lower ring 42. The upper ring 40, in turn, is secured to flange 44 of base 14 thereby fixing the sieve relative to the base.

Figure 3:
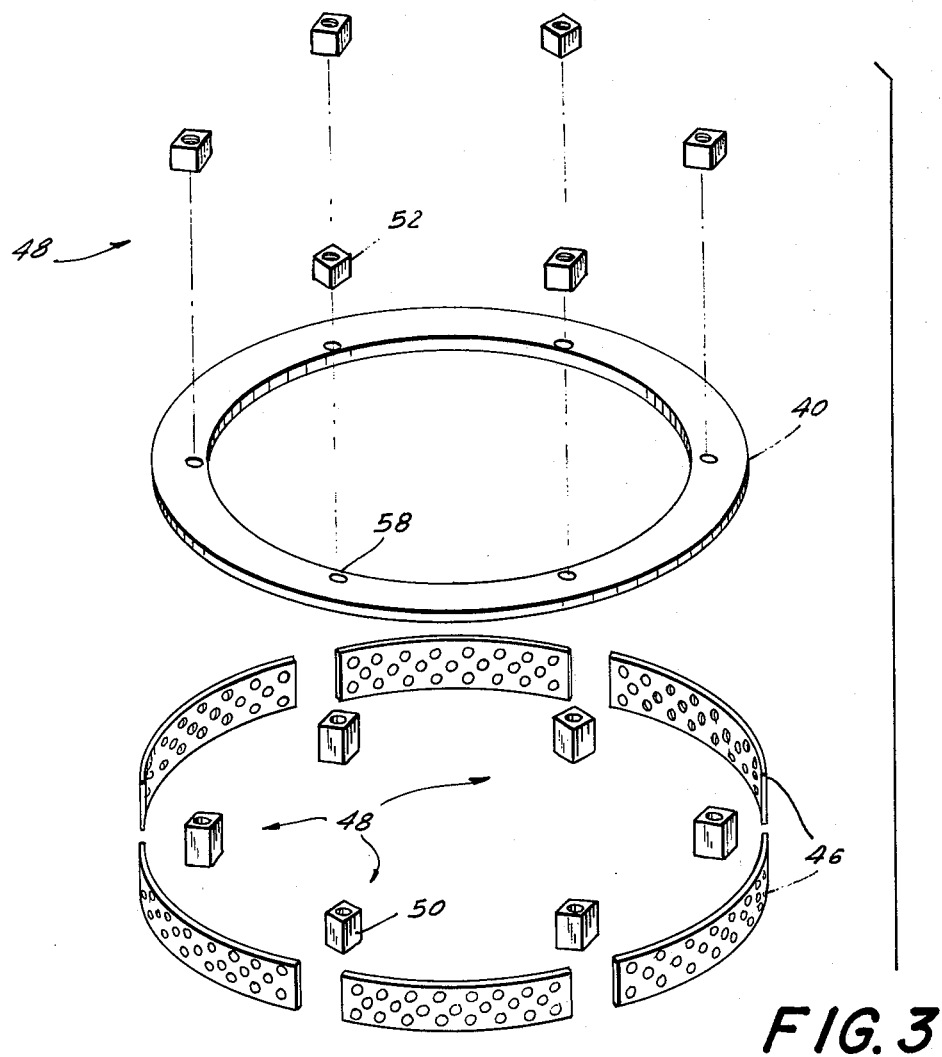
FIG. 3 is an exploded perspective view showing the components which in assembly form the pulping machine perforated ring that carries the stationary shear members.

Referring to FIG. 3, it can be seen that sieve 16 in fact comprises a plurality of identical arcuate perforate members 46. The bottom edges of members 46 seat in a recess extending about the upper surface of bottom ring 42 and the upper edges of members 46 seat in a similar ring extending about the bottom edge of top ring 40.

A plurality of stationary shear blade members 48 are provided disposed about sieve 16 interposed between the arcuate members 46. In this connection, referring to FIG. 3, it can be seen that each of the shear members 48 comprises a lower portion 50 and an upper portion 52. The lower portion 50 seats on the top surface of bottom ring 42 interposed between two adjacent arcuate members 46. The top portion 52 seats on top of the top ring 40. A bolt 54 passes through aligned openings 56 and 58 respectively in the bottom and top rings to capture the bottom and top portions (50 and 52 respectively) of shear member 48 and maintain the vertical alignment of the two. To this end, threaded openings are provided in the stationary shear blade portions to engage the bolt.

Each stationary shear blade member is mounted so that an edge of each portion periodically mates with the forward edge of shear member 36 as the impeller rotates. To this end, referring to FIG. 2, it can be seen that the edges 60 and 62 of each stationary shear blade member 48 will periodically come in contact with the moving shear blade member 36 upon rotation of the impeller thereby producing a cutting action similar to that of a scissor. As also shown in FIG. 2, removable wipers 64 are provided on the surface of the impeller. The wipers fit into recesses 66 that extend to the impeller periphery. The wipers serve to remove material that might otherwise lodge between the impeller and the sieve lower rim.

The top and bottom portions of the stationary blade member 48 are generally square in plan configuration. In this manner, as edges 60 and 62 become worn, a new edge may be provided by rotating the blade portions 90°. This can easily be effected by removing bolt 54, rotating the shear member portions 50 and 52, and then replacing the bolt. When all four edges of shear member 48 are worn the shear member portions may be replaced. Similarly, when the shearing edge of member 36 is worn, it may easily be unscrewed and replaced. To prevent the inadvertent rotation of the stationary blade portions in response to wiping by the rotating shear member, a key 64' is provided which serves to prevent such rotation.

It should be noted that the shear edges 60 and 62 of the stationary blades extend inwardly of the inner edge of the top and bottom rings to properly mate with the blades 36 mounted to the impeller. In a successful practice, the shear edges 60 and 62 extend approximately 0.06 inches beyond the inner edge of the top and bottom rings. Further, the stationary shear members were offset at an angle of 12° (as shown in FIG. 6).

During operation, waste and water are introduced into the pulping chamber where waste is pulped through the action of the impeller teeth until reduced to a size where the solids can pass through the openings in sieve 16, into the slurry chamber 20. Thereafter, solids move through a discharge port 70 and into a pump (not shown) for transport to an extractor (not shown) where excess water is removed and returned to the pulper. If during the operation of the device a shearing edge becomes worn or damaged, that edge may readily be replaced in the manner described above. That is, in the case of the stationary shear members, a new shear edge may be rotated in position until all the edges are worn, at which time the shear blade portions must be replaced. Similarly, in the case of the impeller mounted shear members, as their edges become worn they may readily be unscrewed and replaced. Also, if the sieve is damaged, only the damaged section 46 need be replaced.

Thus, in accordance with the above, the aforementioned objects are effectively attained.

We claim:

1. In a waste disposal unit of the type having: a cylindrical tank for receiving waste material and water, a wall of said tank, the bottom portion of said tank extending radially inwardly from said wall, a disc impeller in said tank spaced from said wall and supported for rotary motion, means for rotating said impeller, a sieve ring encircling said impeller supported in said tank between said wall and said impeller, said sieve ring having a bottom edge and a top edge and being formed with a plurality of through apertures; the improvement comprising: a bottom ring supported in said tank encircling said impeller, said sieve ring bottom edge being seated on said bottom ring; a top ring encircling said impeller seated on the top edge of said sieve ring; said sieve ring comprising at least two identical interchangeable arcuate sections; first shear member support means secured to said impeller; second shear means support means secured stationary relative to said impeller; a first shear member removably mounted to said first shear member support means; second shear means mounted to said second shear means support means, said second shear means including a lower portion extending between said top and bottom rings interposed between said sieve ring arcuate sections and an upper portion axially aligned with said lower portion seated on said top ring and projecting upwardly therefrom, each of said upper and lower shear means portions having four longitudinally extending cutting edges, said second shear means upper and lower portions being rotationally adjustably mounted to said second shear means support means so that upon rotational adjustment, a different cutting edge comes into play; said first shear member having a cutting edge for periodically coming into play with a cutting edge of said second shear means portions upon rotation of said impeller.

2. The waste disposal unit in accordance with claim 1 comprising a plurality of identical interchangeable arcuate sections and an equal plurality of second shear means, each means having lower and upper portions interposed between said arcuate section whereby to form a continuous sieve.

3. A waste disposal unit in accordance with claim 1 further comprising key means in locking relationship with said second shear means lower portions to prevent the inadvertent rotation of said second shear means lower portions.

* * * * *